United States Patent
Rosenfeld et al.

(10) Patent No.: US 6,218,496 B1
(45) Date of Patent: Apr. 17, 2001

(54) POLYIMIDESILOXANE ADHESIVE

(75) Inventors: Jerold C. Rosenfeld; Sergio R. Rojstaczer, both of Amherst; John A. Tyrell, Williamsville, all of NY (US)

(73) Assignee: Occidental Chemical Corporation, Dallas, TX (US)

( * ) Notice: Subject to any disclaimer, the term of this patent is extended or adjusted under 35 U.S.C. 154(b) by 0 days.

(21) Appl. No.: 08/220,562

(22) Filed: Mar. 31, 1994

(51) Int. Cl.$^7$ ............................................... C08G 77/26
(52) U.S. Cl. ........................ 528/26; 528/38; 528/28; 524/726; 524/860; 427/387; 428/447; 428/448
(58) Field of Search ................... 528/38, 28, 26; 524/726, 860; 427/387; 428/447, 448

(56) References Cited

U.S. PATENT DOCUMENTS

| | | | |
|---|---|---|---|
| 5,008,361 | * 4/1991 | Lee | 528/26 |
| 5,041,513 | * 8/1991 | Okinashima et al. | 528/10 |
| 5,094,919 | 3/1992 | Yamada et al. | 428/450 |
| 5,252,703 | * 10/1993 | Nakajima et al. | 525/423 |
| 5,262,505 | * 11/1993 | Nakashima et al. | 528/26 |

FOREIGN PATENT DOCUMENTS

| | | | |
|---|---|---|---|
| 0538075 | * | 4/1993 | (EP) . |
| 538075 | | 4/1993 | (EP) . |

\* cited by examiner

*Primary Examiner*—Margaret G. Moore
(74) *Attorney, Agent, or Firm*—Richard D. Fuerle; Ann E. Brookes

(57) ABSTRACT

Disclosed is a polyimidesiloxane adhesive made by reacting in a solution of an organic solvent a dianhydride selected from the group consisting of biphenyl dianhydride and oxydiphthalic anhydride with an approximately stoichiometric amount of a diamine. The diamine is a mixture of about 5 to about 30 mole % of a siloxane-containing diamine and about 70 to about 95 mole % of a non-siloxane containing diamine. The non-siloxane containing diamine is a mixture of about 10 to about 90 mole % each of at least two of the diamines 2,2-bis(4[4-aminophenoxy]phenyl) propane, α,α'-bis(4-aminophenyl)-1,4-diisopropylbenzene, 3,3'-diaminophenylsulfone, and 1,3-bis(3-aminophenoxy) benzene. The adhesive can be made into one, two, and three-layer tapes (or dispensed in other ways) which have a high $T_g$ and a relatively low bonding temperature.

22 Claims, No Drawings

POLYIMIDESILOXANE ADHESIVE

BACKGROUND OF THE INVENTION

This invention relates to polyimidesiloxanes having a high $T_g$ and a relatively low bonding temperature and to hot melt adhesives made therefrom, particularly in the form of tapes. In particular, it relates to polyimidesiloxanes made by reacting 3,3',4,4'-biphenyltetracarboxylic dianhydride (BPDA) or bis(3,4-dicarboxyphenyl)ether dianhydride, also known as oxydiphthalic anhydride (ODPA), with a siloxane-containing diamine and a mixture of at least two of the following diamines: 2,2-bis(4[4-aminophenoxy]phenyl) propane (BAPP), 2,2'-bis(4-aminophenyl)-1,4-diisopropylbenzene, also known as bis-aniline P (BAP), 3,3'-diaminophenylsulfone (APS), and 1,3'-bis(3-aminophenoxy)benzene (APB).

In the electronics industry, adhesive tapes are used for a variety of purposes such as, for example, bonding a metal lead frame to an integrated circuit chip. Such tapes, useful for LOC (lead on chip) attachments, are required to be of high purity, have excellent adhesive properties, and be easy to apply using mass production techniques.

In some of these applications, it is very desirable for the adhesive tape to have a $T_g$ in excess of about 200° C. so that a chip bonded with the adhesive tape remains rigid during wire bonding, as rigidity prevents the formation of weak bonds. At the same time, the temperature at which the tape bonds to a substrate should be relatively low to permit more rapid processing of the chips and cause less thermal stress and damage. (See U.S. Pat. No. 4,624,978.)

Normally, the requirements for a high $T_g$ and a relatively low bonding temperature are contradictory. That is, most polyimidesiloxanes have a bonding temperature at least 100° C. higher than their $T_g$, and the higher the $T_g$ the greater will usually be the difference between the bonding temperature and the $T_g$.

SUMMARY OF THE INVENTION

We have discovered that adhesive tapes made with BPDA or ODPA, a siloxane-containing diamine, and a mixture of at least two of the diamines BAPP, BAP, APS, and APB have $T_g$'s in excess of 200° C., and often in excess of 230° C., and a bonding temperature that is only 20 to less than 70 degrees higher than their $T_g$. This is apparently due to a synergistic interaction between the diamines because the mixture of diamines produces a polyimidesiloxane having a smaller difference between the bonding temperature and the $T_g$ than does any of the diamines by itself. A synergistic interaction between the two diamines is also demonstrated by the fact that the peel strength of a polyimidesiloxane adhesive made with that mixture of diamines is higher than the peel strength of polyimidesiloxane adhesives made from any of the diamines by itself.

The unusual polyimidesiloxanes of this invention can be used to prepare one, two, or three-layer adhesive tapes. Because of the high $T_g$ and relatively low bonding temperature of these tapes and the fact that they do not evolve volatiles during use, the tapes are highly desirable for applications in the electronics industry.

DESCRIPTION OF THE INVENTION

The polyimidesiloxanes used in the process and product of this invention are not only fully imidized but are also thermoplastic and soluble in a solvent. The polyimidesiloxanes can be formed by reacting a dianhydride (BPDA, ODPA, or mixtures thereof) with at least two of the four diamines (BAPP, BAP, APS, and APB)—plus a diamine containing siloxane groups.

We have found only two dianhydrides, BPDA and ODPA, that result in polyimidesiloxanes having the unexpected property of a high $T_g$ and a relatively low bonding temperature. Mixtures of these two dianhydrides can also be used. The preferred dianhydride is BPDA because it results in adhesives having a higher $T_g$ and a higher peel strength.

We have further found that only mixtures of two or more non-siloxane containing diamines selected from BAPP, BAP, APS, and APB result in polyimidesiloxanes having the unexpected properties of higher $T_g$ and relatively low bonding temperatures. The diamines BAPP, APS, and APB in the mixture can be present in an amount of about 10 to about 90 mole % and the diamine BAP can be present in the mixture in an amount of about 10 to about 80 mole % (based on the mixture of these diamines). A preferred mixture is about 10 to about 90 mole % BAPP and about 10 to about 80 mole % BAP as; if more than 90 mole % BAPP is used, the $T_g$ of the polyimidesiloxane becomes unacceptably low and if more than about 80 mole % BAP is used the polyimidesiloxane becomes difficult to bond. With BAPP and BAP, the diamines are more preferably used in a proportion of about 20 to about 80 mole % BAPP to about 20 to about 80 mole % BAP; the maximum properties seem to be achieved at a 50:50 molar ratio. BAPP and BAP are the preferred diamines.

The siloxane-containing diamines can be either aromatic or non-aromatic, but non-aromatic diamines are preferred as they are more readily available. Examples of siloxane-containing diamines that can be used include diamines having the formula

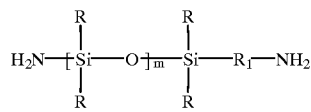

where R and $R_1$ are mono and diradicals, respectively, each independently selected from a substituted or unsubstituted 1 to 12 carbon atom aliphatic group or a substituted or unsubstituted 6 to 10 carbon atom aromatic group. Examples of monoradicals include —$CH_3$, —$CF_3$, —CH=$CH_2$, —$(CH_2)_nCF_3$, —$C_6H_5$, —$CF_3$—CHF—$CF_3$, and

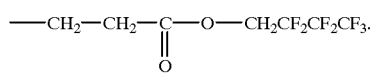

Examples of diradicals include —$(CH_2)_n$—, —$(CF_2)_n$—, —$(CH_2)_nCF_2$— and —$C_6H_4$—, where n is 1 to 10. The siloxane diamines are herein denoted by the notation "$G_m$", where "m" is the same "m" that is in the above formula and can be 1 to 200, but is preferably 1 to 12.

The polyimidesiloxanes of this invention are made using approximately stoichiometric quantities of diamine and dianhydride as that generally results in the highest molecular weight polyimidesiloxane, but the equivalent ratio of dianhydride to diamine can range from about 1:2 to about 2:1. The diamine portion of the polyimidesiloxane of this invention is about 1 to about 30 mole % siloxane containing diamine and about 70 to about 99 mole % of the diamine mixture of two or more of BAPP, BAP, APS, and APB. If more siloxane containing diamine is used the $T_g$ is lower, and if less siloxane containing diamine is used the polyimidesiloxane is less soluble and less adhesive. Preferably, about 10 to about 20 mole % of the diamine portion is the siloxane-containing diamine and about 80 to about 90 mole % of the diamine portion is the mixture of BAPP, BAP, APS, and APB.

The polyimidesiloxanes of this invention are typically prepared by forming a solution of the dianhydride and the three or more diamines. It is preferable to also include about 1 to about 2 mole % of a soluble endcapping agent in this solution to keep the molecular weight uniform so that its properties and processing do not vary greatly from batch to batch. The endcapping agent is a compound that has only a single anhydride group or a single amine group. Preferably, it has only a single anhydride group. Examples of endcapping agents include phthalic anhydride (PA), alkyl and aryl substituted phthalic anhydrides, and polynuclear anhydrides such as 1,8-naphthalic anhydride. The preferred endcapping agent is phthalic anhydride (PA) because it is readily available and thermally stable.

The solvent used to form the solution of the dianhydride and diamines should also dissolve the polyimidesiloxane that is formed. Suitable solvents depend upon the particular composition of the polyimidesiloxane that is to be made and dissolved, but may include N-methylpyrrolidinone (NMP), diglyme, triglyme, cyclohexanone, cyclopentanone, dimethylacetamide, and mixtures of these solvents. The solvent preferably has a boiling point between 130 and 210° C. as lower boiling solvents may evaporate too readily from the completed tape and higher boiling solvents may be too difficult to remove from the tape. The solution of the polyimidesiloxane in the solvent can be any percent solids desired, but it is preferably about 10 to about 30 wt % solids as more dilute solutions mean more solvent to evaporate and more concentrated solutions are too viscous.

The first reaction, which forms the polyamic acid, occurs at room temperature and the second reaction, which closes the imide rings, occurs at a temperature of about 150 to about 180° C. Typically, the reaction mixture is refluxed several hours to substantially fully imidize the polymer. If it is desirable to prepare a very pure adhesive which does not contain ionic species, the polyimide can be precipitated from solution by addition to water, filtered, washed with water, dried, and redissolved in a second solvent (which may be identical to the first solvent used). If such a standard of purity is not required, the solution of polyimide can be used as it was prepared. A more complete description of the preparation of solvent-soluble fully imidized thermoplastic adhesive polyimidesiloxanes can be found in U.S. Pat. No. 4,973,645, herein incorporated by reference.

A single layer tape can be made by depositing the solution of polyimide on a non-stick surface such as silicone-treated polyethylene terephthalate or polytetrafluoroethylene. The solvent is then evaporated and the resulting polyimide film is peeled from the surface. The two and three-layer tapes of this invention are made by applying the solution of the polyimidesiloxane to a carrier film and forming a coating on the carrier film. The solvent is then evaporated from the coating. If a two-layer tape is desired the solution is applied to only one side of the carrier film, while if a three-layer tape is desired the solution is applied to both sides of the carrier film. Typically, the carrier film is positioned horizontally while the solution is spread over its upper surface with a doctor blade. The solvent is then evaporated, and, if a three-layer tape is desired, the carrier film is inverted, and the procedure is repeated. This can be accomplished by hand or in an automated process. Other methods of manufacturing the tape, such as by dipping or running the carrier film through a solution of the polyimidesiloxane followed by wiping and evaporation, are also contemplated. Repeated applications of the solution may be required to build up the desired thickness of adhesive on the tape. The adhesive layer can have a thickness of about 0.1 to about 5 mils on each side of the carrier film and a preferred thickness is about 0.5 to about 1 mils on each side.

The carrier film can be made from almost any organic polymeric material to which the polyimidesiloxane will adhere. The polymeric material should have sufficient solvent resistance to the polyimidesiloxane solution to prevent its dissolution. The surface of the carrier film can be prepared to enhance the adhesion of the polyimidesiloxane to it. Such preparation can include treatment with a corona or with various chemicals. Many types of carrier films are sold pretreated to increase their adhesion. Preferably, the carrier film is either an amorphous polymer with a $T_g$ greater than 150° C. or a crystalline polymer with a melting point greater than 150° C. so that it can easily withstand the tape preparation and bonding conditions. Examples of such carrier films include polyimides, polyimidesiloxanes, polyethylene terephthalate, polyethylenenaphthalate, polyetheretherketones, polysulfones, and polyamides, such as nylon 66. The preferred material for the carrier film is a polyimide. The thickness of the carrier film can vary from about ½ to about 10 mils, but it is preferably about 1 to about 2 mils thick.

After the tape has been made and the solvent evaporated, the adhesive surfaces are no longer tacky and the tape can be rolled up and stored for use. During use the tape is cut to the desired size and the surfaces to be bonded to it are heated and pressed against it. Typically, a temperature of about 200 to about 350° C. is used at a pressure of about 10 to about 200 psi. The tape forms a bond quickly and generally the pressure needs to be applied for less than 1 to about 30 seconds, though longer times are used in laboratory tests.

Although the tape can be used for many different applications, the principal use contemplated for the tape of this invention is to bond components in the microelectronics industry. Such uses include bonding metal lead frames to integrated circuit chips, chips to lead frames, lead frames to each other, chips to chip-carriers and chips to heat-spreaders.

The following examples further illustrate this invention.

EXAMPLE 1

A clean, three-necked, one-liter flask fitted with a thermometer, mechanical stirrer, condenser, and Dean-Starke trap with condenser, was purged with dry nitrogen. To the flask was added 500 ml of freshly opened NMP, 50 ml of toluene, and 41.63 gm (0.1415 moles) of BPDA. The mixture, after stirring, was opaque. Then 0.42 gm (0.0028 moles) PA, 1.0 gm (0.0040 moles) bis(3-aminopropyl) tetramethyl disiloxane ($G_1$), and 10.0 gm $G_9$ (0.0119 moles) were added and stirred at room temperature for 4 hours. The mixture was still opaque. Then 25.77 gm (0.0628 moles) BAPP and 21.60 gm BAP (0.0628 moles) were added and the mixture was stirred 14 hours at room temperature. The solution was now clear (no undissolved solids). The solution was heated to 170 to 175° C. for 5 hours during which time approximately 11 mls of water was removed with the refluxing toluene. The system was converted for vacuum distillation and some of the solvent was stripped off. The solution was cooled and precipitated into water in a blender. The solid polymer was reslurried and made finer via high speed stirring, then filtered and dried in a glass tray at 105° C. for 16 hours. The yield was 86.5 gms and the $T_g$ was 249.3. (The Glass Transition Temperature $T_g$ was determined by Dynamic Mechanical Thermal Analysis (DMTA). The $T_g$ is taken as the temperature at which the dissipation Tan delta peaks at a heating rate of 4° C./min in tension mode at 1 Hz.)

A 25 wt % solution of polymer was prepared by weighing the dry precipitated polymer into a vial with NMP and slowly rotating overnight. Adjustments were made if the viscosity was too high or too low for casting. The solution was allowed to stand at room temperature to release air bubbles. The solution was cast onto a surface treated (release agent) polyethylene terephthalate (PET) film with a 15 or 20 mil doctor blade and dried in a circulating air oven which increased the temperature at a rate of 8° C./min. The temperature was held at 220° C. for 1 hour then cooled at a rate of 8° C./min. Panels, approximately 1"×2.5 to 3" and 8 mils thick, of "Alloy 42" (42 wt % nickel and 58 wt % iron), were cleaned with detergent and hot water in an ultrasonic bath, then rinsed with water 3 to 5 minutes in a dish with distilled water in an ultrasonic bath for 3 to 5 minutes, and with acetone in a beaker in an ultrasonic bath for 3 to 5 minutes. The pieces were removed one by one, rinsing with acetone and drying in a dry, clean nitrogen stream.

The previously prepared films were cut into strips of ¼" (6.35 mm) by about 2 inches to 2.5 inches. A strip of film was placed on a cleaned panel with the "air" side of film down (i.e., side that was not in contact with the PET). A strip of polytetrafluoroethylene was placed on top. This sandwich was placed on top of a thin sheet of aluminum and the entire assembly was placed in a preheated Carver Press. Two hundred and fifty pounds of pressure were applied for 60 seconds. The sandwich was removed and allowed to cool. Samples were bonded at a series of temperatures. Peel strength was then tested (90°). The rate of peel was 1.9 cm/minute. Bond temperature was taken as the temperature at which the peel strength plateaued.

EXAMPLES 2 to 19

Example 1 was repeated using different components and ratios. The following table summarizes the preparation of these polyimidesiloxane adhesives and gives their $T_g$, bonding temperature (BT), BT-$T_g$, and 90° peel strength:

| Ex. No. | Dianhydride Used | Diamines (moles) | G (wt %) | G (wt %) | PA[1] | T (° C.) | BT (° C.) | BT-$T_o$ | Peel Strength (kg/cm) |
|---|---|---|---|---|---|---|---|---|---|
| Diamine Ratio Varied |
| 1 | BPDA | BAPP(1)BAP(1) | 10 | 1 | 2 | 249 | 300 | 51 | 1.4 |
| 2 | *BPDA | BAPP(1) | 10 | 1 | 2.5 | 230 | 300 | 70 | 1.1 |
| 3 | BPDA | BAPP(1)BAP(3) | 10 | 1 | 2 | 257 | 300 | 43 | 1.1 |
| 4 | *BPDA | BAPP(1)BAP(9) | 10 | 1 | 2 | 260 | 350 | >90 | 0.8 |
| 5 | *BPDA | BAP(1) | 10 | 1 | 2 | Resin Not Soluble | | | |
| Dianhydride Varied |
| 6 | BPDA | BAPP(1)BAP(1) | 10 | 1 | 2 | 249 | 300 | 51 | 1.4 |
| 7 | ODPA | BAPP(1)BAP(1) | 10 | 1 | 2 | 223 | 275 | 52 | 1.5 |
| 8 | *BTDA | BAPP(1)BAP(1) | 10 | 1 | 2 | 234 | >350 | 116 | 0.6 |
| 9 | *BTDA | TDA(1) | | | | 260 | 350 | | 0.0 |
| 10 | *PMDA | BAPP(1)BAP(1) | 10 | 1 | 2 | Resin Not Soluble | | | |
| Diamine Varied |
| 11 | BPDA | BAPP(1)BAP(1) | 10 | 1 | 2 | 249 | 300 | 51 | 1.4 |
| 12 | *BPDA | BAPP(1)ODA(1) | 10 | 1 | 2 | Resin Not Soluble | | | |
| 13 | BPDA | BAPP(1)APS(1) | 10 | 1 | 2 | 250 | 300 | 50 | 1.4 |
| 14 | *BPDA | TPEQ(1)BAP(1) | 10 | 1 | 2 | Resin Not Soluble | | | |
| 15 | *BPDA | BAPP(1)BAF(1) | 10 | 1 | 2 | 259 | >350 | >91 | 0.6 |
| 16 | BPDA | BAPP(3)APB(1) | 10 | 1 | 2 | 223 | 275 | 52 | 0.2 |
| 17 | *BPDA | BAPP(3)TDA(1) | 10 | 1 | 0 | 251 | 320 | 69 | 0.8 |
| Higher $G_o$ Level |
| 18 | *BPDA | BAPP(1) | 10 | 1 | 2.5 | 230 | 300 | 70 | 1.1 |
| 19 | *BPDA | BAPP(1) | 18 | 2 | 2.5 | 205 | 275 | 70 | 1.1 |

1. Mole % based on anhydride.
*Comparative Examples.
BTDA = 3,3',4,4'-benzophenone tetracarboxylic dianhydride
TDA = 2,4-diaminotoluene
PMDA = pyromellitic dianhydride
ODA = 4,4'-diaminodiphenyl ether or 4,4'-oxydianiline
TPEQ = 1,4-bis(4-aminophenoxy)benzene
BAF = 2,2'-bis(4-aminophenyl)-hexafluoropropane The above table shows that $T_g$ increases with the amount of BAP in the BAP/BAPP mixture and that the difference between $T_g$ and bonding temperature is minimized and peel strength is maximized at about 50 to 75 mole % BAP vs. BAPP.

With all BAPP, $T_g$ and solubility are lower (for the imidized polymer) compared to the BAP/BAPP at 1/1 and 1/3. At high levels of BAP, bonding temperature increases much more than $T_g$ and solubility decreases.

Besides BPDA, ODPA also works well but gives a somewhat lower $T_g$. BTDA in place of BPDA did not bond well, requiring high bonding temperature (large "BT-$T_g$") and relatively low peel strength. With PMDA, the imidized polymer was insoluble.

The combination of BAPP and APS gave relatively high $T_g$, low "BT-$T_g$" and good peel strength. BAPP and APB (3/1) gave a somewhat lower $T_g$ but bonded well (low "BT-$T_g$" and high peel strength).

The examples of this invention have a high $T_g$ compared to polymers prepared from only BAPP (Comparative Example 1) and have improved solubility compared to polymers prepared from only BAP. The examples of this invention also have desirably small difference between $T_g$ and bonding temperature, which is not readily achieved with other diamines.

We claim:

1. A solution consisting essentially of
   (I) an organic solvent;
   (II) a polyamic acid consisting essentially of the reaction product of
      (A) a dianhydride selected from the group consisting of 3,3', 4,4'-biphenyltetracarboxylic dianhydride, bis(3, 4-dicarboxyphenyl)ether dianhydride, and mixtures thereof; and
      (B) total diamine in a molar ratio with said dianhydride of about 1:2 to about 2:1, where said total diamine consists essentially of
         (1) about 1 to about 30 mole %, based on total diamine, of a siloxane-containing diamine; and
         (2) about 70 to about 99 mole %, based on total diamine, of a mixture of at least two diamines selected from the group consisting of
            (a) about 10 to about 90 mole %, based on said mixture, of 2,2-bis(4[4-aminophenoxy]phenyl)propane;
            (b) about 10 to about 80 mole %, based on said mixture of 2.2'-bis(4-aminophenyl)-1,4-diisopropylbenzene;
            (c) about 10 to about 90 mole %, based on said mixture, of 3,3'-diaminophenylsulfone; and
            (d) about 10 to about 90 mole %, based on said mixture, of 1,3-bis(3-aminophenoxy)benzene.

2. A solution according to claim 1 wherein said polyamic acid includes about 1 to about 2 mole % phthalic anhydride.

3. A solution according to claim 1 wherein said organic solvent is N-methylpyrrolidone.

4. A solution of a polyimidesiloxane made by cyclizing the amic acid groups of polyamic acid in a solution according to claim 1.

5. A polyimidesiloxane precipitated from a solution according to claim 4.

6. A solventless, substantially fully imidized polyimidesiloxane adhesive film consisting essentially of the reaction product of
   (A) a dianhydride selected from the group consisting of 3,3',4,4'-biphenyltetracarboxylic dianhydride, bis(3,4-dicarboxyphenyl)ether dianhydride, and mixtures thereof; and
   (B) total diamine in a molar ratio with said dianhydride of about 1:2 to about 2:1, where said total diamine consists essentially of
      (1) about 1 to about 30 mole %, based on total diamine, of a siloxane-containing diamines; and
      (2) about 70 to about 99 mole %, based on total diamine, of a mixture of diamines which consists essentially of
         (a) about 10 to about 90 mole %, based on said mixture of 2,2-bis(4[4-aminophenoxy]phenyl)propane;
         (b) about 10 to about 80 mole %, based on said mixture of 2,2'-bis(4-aminophenyl)-1,4-diisopropylbenzene;
         (c) about 10 to about 90 mole %, based on said mixture, of 3,3'-diaminophenylsulfone; and
         (d) about 10 to about 90 mole %, based on said mixture, of 1,3-bis(3-aminophenoxy)benzene.

7. A polyimidesiloxane adhesive film according to claim 6 wherein the molar ratio of dianhydride to total diamine is approximately stoichiometric.

8. A polyimidesiloxane adhesive film according to claim 6 which is free-standing.

9. A polyimidesiloxane adhesive film according to claim 6 wherein said mixture of diamines comprises about 20 to about 80 mole % 2,2-bis(4[4-aminophenoxy]phenyl) propane and about 20 to about 80 mole % 2,2'-bis(4-aminophenyl)-1,4-diisopropylbenzene.

10. A polyimidesiloxane adhesive film according to claim 6 wherein said mixture of diamines comprises about 20 to about 80 mole % 2,2-bis(4[4-aminophenoxy]phenyl) propane and about 20 to about 80 mole % 3,3'-diaminophenylsulfone.

11. A polyimidesiloxane adhesive film according to claim 6 wherein said mixture of diamines comprises about 20 to about 80 mole % 2,2-bis(4[4-aminophenoxy]phenyl) propane and about 20 to about 80 mole % 1,3-bis(3-aminophenoxy)benzene.

12. A free-standing two-layer adhesive tape comprising a polyimidesiloxane adhesive film according to claim 6 bonded to a carrier film.

13. A free-standing three-layer adhesive tape comprising a polyimidesiloxane adhesive film according to claim 6 bonded to each side of a carrier film.

14. A free-standing three-layer adhesive tape according to claim 13 wherein said carrier film is a polyimide.

15. A method of making a polyimidesiloxane adhesive film comprising
   (A) forming a solution according to claim 1;
   (B) heating said solution at about 150 to about 180° C. to form a solution of a substantially fully imidized polyimidesiloxane;
   (C) spreading said solution on a surface; and
   (D) evaporating said organic solvent from said solution to form an adhesive film on said surface.

16. A method according to claim 15 wherein said surface is a non-stick surface and said adhesive film is peeled from said surface.

17. A method according to claim 15 wherein said surface is a carrier film and said solution is spread on only one side of said carrier film.

18. A method according to claim 15 wherein said surface is a carrier film and said solution is spread on both sides of said carrier film.

19. A method of making an adhesive film comprising
   (A) forming a first solution according to claim 1;
   (B) heating said first solution at about 150 to about 180° C. to form a solution of a substantially fully imidized polyimidesiloxane;
   (C) precipitating said substantially fully imidized polyimidesiloxane from said first solution;
   (D) washing said precipitated substantially fully imidized polyimidesiloxane;
   (E) forming a second solution by dissolving said precipitated substantially fully imidized polyimidesiloxane in an organic solvent;
   (F) spreading said second solution on a surface; and
   (G) evaporating said organic solvent from said second solution to form an adhesive film on said surface.

20. A method according to claim 19 wherein said surface is a non-stick surface and said adhesive film is peeled from said surface.

21. A method according to claim 19 wherein said surface is a carrier film and said second solution is spread on only one side of said carrier film.

22. A method according to claim 19 wherein said surface is a carrier film and said second solution is spread on both sides of said surface.

* * * * *